United States Patent [19]  
Trakas

[11] Patent Number: 4,900,560  
[45] Date of Patent: Feb. 13, 1990

[54] MULTI-GATE MOLDING HEATER ASSEMBLY

[76] Inventor: Panos Trakas, 21 W. Wrightwood, Glendale Heights, Ill. 60139

[21] Appl. No.: 317,614

[22] Filed: Mar. 1, 1989

[51] Int. Cl.$^4$ .............................................. B29C 45/20
[52] U.S. Cl. .................................. 425/549; 264/297.2; 264/328.8; 264/328.15; 425/568; 425/570; 425/572
[58] Field of Search ............... 264/297.1, 297.2, 328.8, 264/328.15; 425/547, 549, 568, 570, 572, 588

[56] References Cited

U.S. PATENT DOCUMENTS

| 3,533,594 | 10/1970 | Segmuller | 425/568 |
| 4,094,447 | 6/1978 | Gellert | 425/568 |
| 4,344,750 | 8/1982 | Gellert | 425/588 |

FOREIGN PATENT DOCUMENTS 976314 10/1975 Canada .

Primary Examiner—Jay H. Woo  
Assistant Examiner—Timothy W. Heitbrink  
Attorney, Agent, or Firm—Lockwood, Alex, FitzGibbon & Cummings

[57] ABSTRACT

An injection molding heater assembly for use in multi-gate injection molding includes an elongate heating member extending within a mold bore in heating communication with the mold bore mold gates. The heating member has an elongate body portion extending between an inlet portion and an outlet portion. A melt injection passage extends through the inlet portion to convey melt along the body portion to an enlarged portion having a nozzle face. Extending down from the nozzle face are a series of members which include gate tips at their lower ends. Radial channels present in the gate tips serve as extensions to the mold bore mold gates. The gate tips are peripherally spaced apart around the nozzle face and define a recess between the gate tips, the nozzle face and the mold bore for initially injected melt to accumulate in and solidify to form a melt plug. The melt plug serves to insulate the subsequently injected melt from the mold bore and maintain the injected melt in a third condition.

9 Claims, 3 Drawing Sheets

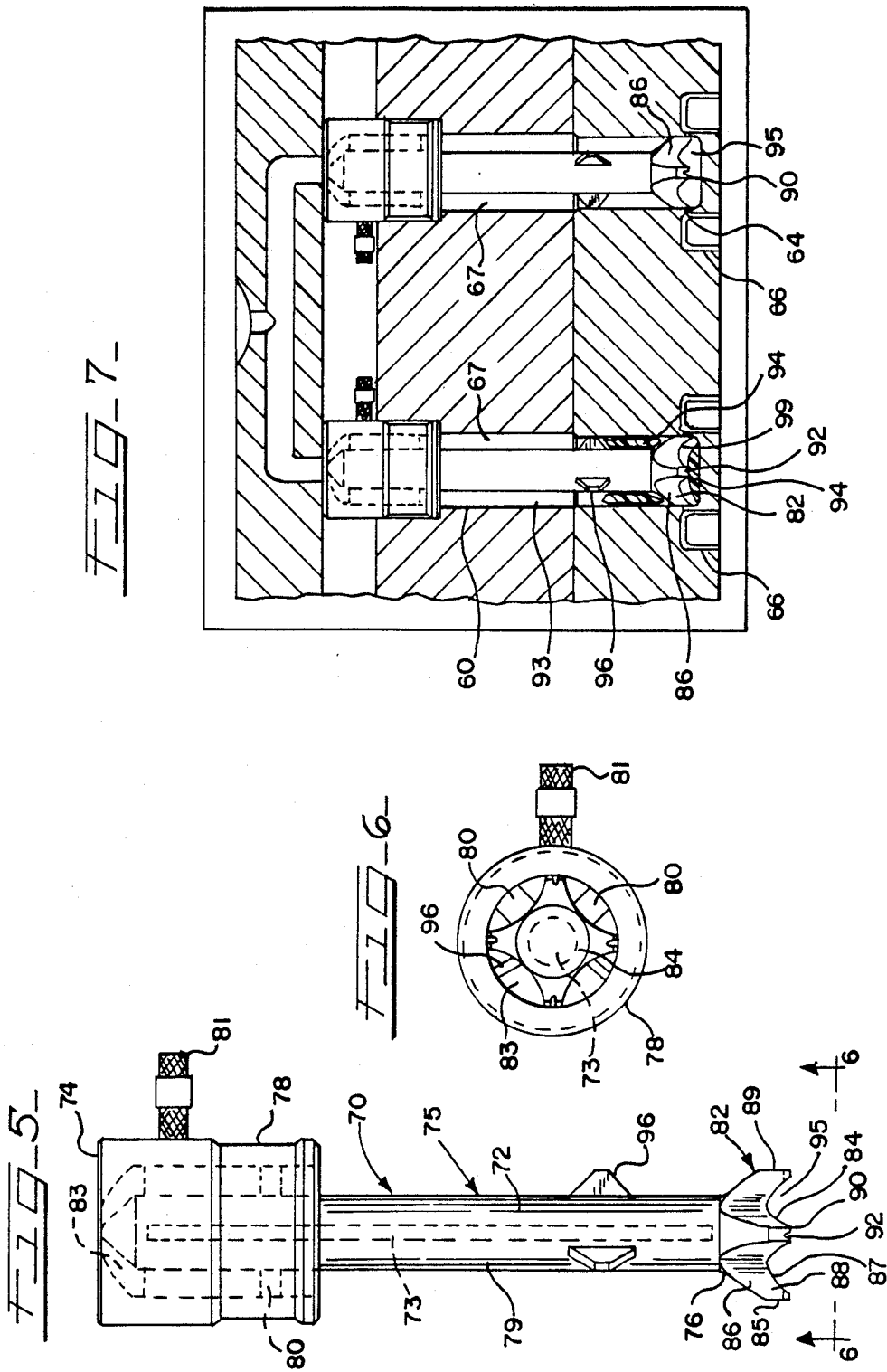

MULTI-GATE MOLDING HEATER ASSEMBLY

BACKGROUND AND SUMMARY OF THE INVENTION

The present invention relates generally to injection molding systems using a heated nozzle disposed in a mold bore to inject melt into multiple mold cavities having multiple mold gates opening from the mold bore into the mold cavities, and more particularly to an improved heater assembly used in multi-cavity injection mold gating.

Injection molding is widely used for the manufacture of a variety of items, some of which have thin and delicate cross sections. These items can be molded in large quantities by using a single heated nozzle that extends into a single mold bore which feeds a number of mold cavities. These mold cavities typically have gates which extend through the mold block between the mold bore and the mold cavity, forming a melt flowpath to convey the injected melt from the bore to the mold cavities. These gates are very small in cross-section and therefore it is desirable to provide a sufficient and constant application of heat to the melt flow which is directed toward each mold gate to ensure that the melt remains fluid while passing through the gates into the mold cavities.

One previous construction of a heated multiple gate nozzle which directs the melt to multiple mold gates is shown in Canadian Pat. No. 976,314, in which a multi-gate heater is disclosed having an intricately milled nozzle face with a series of convex openings formed therein. Another construction such as that shown in U.S. Pat. No. 4,094,447 relies in part on a specific configuration of the mold bore which includes a raised portion of the bore which is generally complementary to the heater nozzle face to fill much of the open area in the bore to cut down on the amount of heat transferred to the mold block during operation. Such approaches require costly machining of both the heater ends and mold block mold bore.

The present invention is directed to an injection molding multi-gate heater assembly construction which is less costly to manufacture in that it does not require extensive machining of the heater nozzle face or of the mold bore, and which has improved heat transfer and reduced heat loss capabilities.

In a multi-gate molding heater assembly constructed in accordance with the present invention, an elongate heated member having opposing inlet and outlet ends is adapted to fit in a mold bore. The heater has a melt injection passage extending through its inlet which directs fluid melt along a body portion of the heated member to a lower member enlarged portion having a nozzle face thereon heated member. The nozzle face has a number of gate tips disposed around its periphery which tips extend downwardly from the nozzle face and away from the heated member body portion to a position in registration with multiple mold gates located in the mold bore. A recess is formed between the gate tips and the mold bore and acts as a melt accumulation area for the initially injected melt to solidify in such that it insulates the subsequently injected melt from the cooler temperatures of the mold block surrounding further the mold bore.

Accordingly, it is a general object of the present invention to provide an improved heater assembly for use in injection molding systems having multiple gates.

Another object of the present invention is to provide a heated sprue bushing having a central melt injection passage which terminates in a bushing nozzle face having multiple gate tips peripherally disposed thereon which direct the melt to the mold bore gates.

It is another object of the present invention to provide a heated torpedo for insertion into a mold bore having a plurality of mold gates defining melt passages to mold cavities disposed in the mold bore wherein the torpedo has multiple gate extension tips disposed thereon in alignment with the mold bore gates.

It is still yet another object of the present invention to provide an improved heater assembly adapted to fit within a mold bore having multiple gates leading to multiple mold cavities, the heater assembly having multiple gate tips peripherally disposed on a heater nozzle face which engage the mold gates, the gate tips defining a recess between the nozzle face and the mold bore for the accumulation of melt therebetween for insulating the heated melt from the mold bore.

These and other objects, features and advantages of the present invention will be clearly understood through a consideration of the following detailed description.

BRIEF DESCRIPTION OF THE DRAWINGS

In the course of this description, reference will be frequently made to the attached drawings in which:

FIG. 5 is an elevational view of a second embodiment of a multi-gate heater assembly incorporating the principles of the present invention;

FIG. 6 is a plan view of the heater assembly of FIG. 5 taken along lines 6—6, and FIG. 7 is an elevational view of a pair of the heater assemblies shown in FIG. 5 in place within a mold block bore.

DESCRIPTION OF THE PREFERRED EMBODIMENTS

Figure 1:
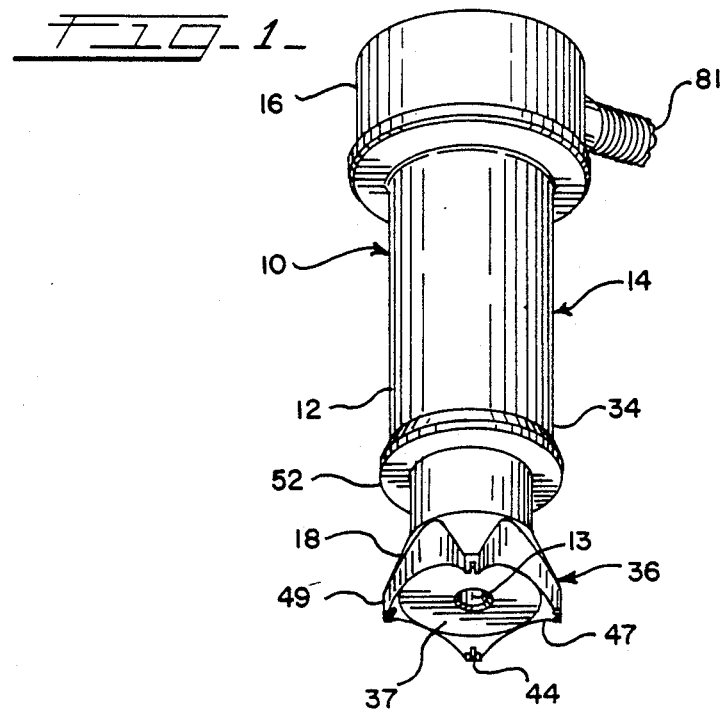
FIG. 1 is a perspective view of one embodiment of a multi-gate heater assembly incorporating the principles of the present invention.

A first embodiment of heater assembly 10 which incorporates the principles of the present invention is shown in FIGS. 1-4. The heater assembly 10 comprises an elongate, generally cylindrial member 12, shown as a sprue bushing 14, having an inlet portion 16 and an outlet portion 18 with a bushing body portion 34 extending therebetween. A melt injection passage 13 extends axially through the bushing to form a passage to convey molten, fluid melt through the inlet end 16 along the interior of bushing body portion 34 to the nozzle face 37 of the bushing 14. The bushing inlet portion 16 may be integrally formed with the bushing body 34 or it may be separately formed and joined together such as by welding. The body portion 34 preferably includes an internal electrical heater element 24 which surrounds the melt injection passage 13 and supplies sufficient heat to the entire heater assembly 10 to maintain the melt passing through the injection passage 13 and into the mold bore 60 in a molten state.

The bushing body 34 and inlet portion 16 are generally cylindrical, with each of them respectively having different uniform outer diameters with the outer diameter of the body 34 being generally reduced with respect to that of the inlet portion 16. An enlarged inlet cap portion 20 is shown to include a nozzle seat 28 at melt passage inlet 30 to receive an injection molding machine or manifold nozzle (not shown). The bushing body 34 extends between the inlet portion 16 and a lower bushing enlarged portion 36. The bushing enlarged portion 36 includes a substantially flat surface 38 having a bushing nozzle face 37 in surrounding relation to the outlet end of injection passage 13.

Surrounding the bushing nozzle face 37 are means for directing the melt flow into the mold cavity gates 64, shown as members 40 which extend a predetermined distance down from the nozzle face 37 and a predetermined distance out from the bushing body 34. The four members 40 are all generally of equal size and each includes an outer surface 49 which is generally complementary in its surface configuration to mold bore wall 62 and an inner, curved surface 47 which extends from the bushing nozzle face 37 to a gate tip 42 at the member lower end 43. The gate tip 42 includes a gate extension or channel 44 which extends radially across the gate tip end 43.

Figure 2:
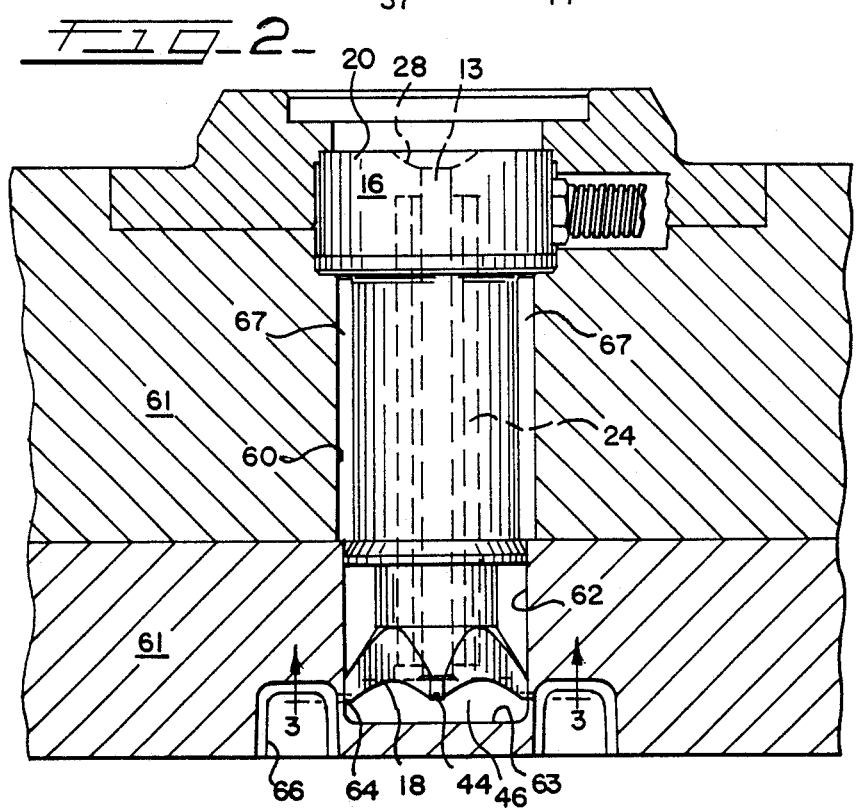
FIG. 2 is an elevational view of the heater assembly of FIG. 1 in place within a bore in a mold block.
Figure 3:
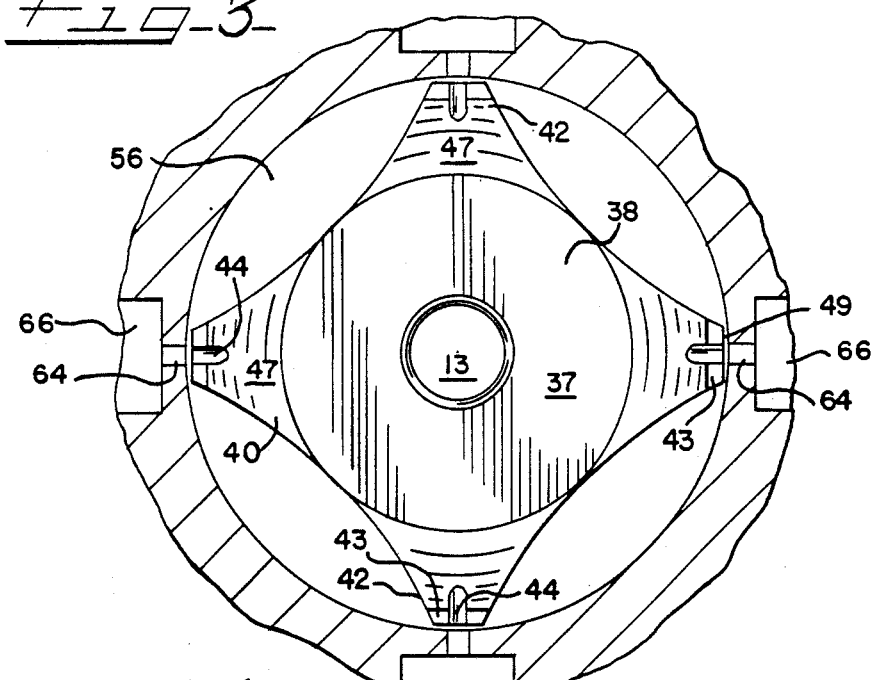
FIG. 3 is a bottom plan view of the heater of FIG. 1 which is partially in section taken along lines 3—3 of FIG. 2.
Figure 4:
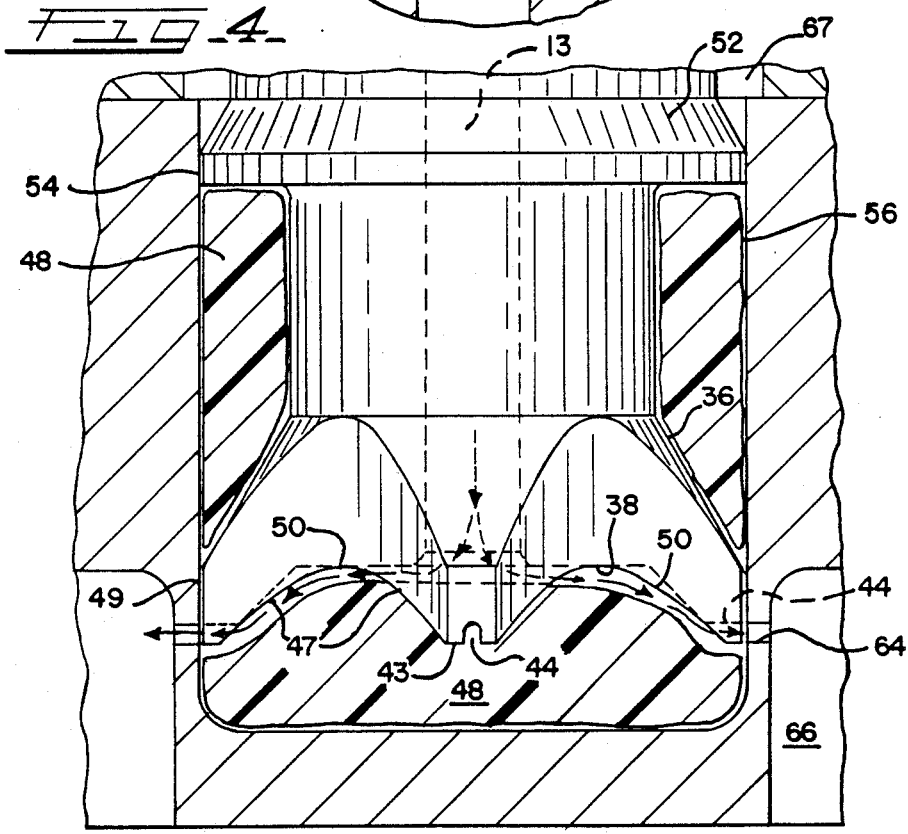
FIG. 4 is an enlarged view of the nozzle face end of the heater of FIG. 1 in place in the mold bore.

The members 40 extend downward from the nozzle face 37 and away from the bushing body 34 a predetermined distance so that the gate tips 42 are very closely spaced to the mold bore wall 62 (FIG. 4) and the gate tip channels 44 are aligned with the mold gates 64 leading to the mold cavities 66 when the heater 10 is inserted into the mold bore 60. In accordance with one aspect of the present invention and as is shown in FIGS. 2 and 4, the gate tips 42 create a recess 46 in the mold bore 60. The recess 46 is located between the inner curved surfaces 47 of gate tips 42, the bushing nozzle face 37 and the mold bore bottom 63.

In operation, the injected melt flows through the central injection passage into the mold bore 60 and fills the lower portion of the mold bore 60. The initially injected melt solidifies when it contacts the cooler mold bore walls 62 and forms a melt plug 48 which substantially fills the recess 46 and the annular space 56 above the gate tips 42 to surround the bushing enlarged portion 36. The gate tips 42 are heated by the bushing internal heater 24 so that the melt in communication with the nozzle face 37 and gate tips 42 remains fluid and creates a melt flow path 50 between the bushing nozzle face 37, the gate tips 42 and the mold block mold gates 64. This melt flow path 50 functions as a melt passage opening between the melt plug 48 and the heater (FIG. 4).

Melt plug 48 serves as a thermal layer between the bushing nozzle face 37 and the surrounding mold block 61 which insulates the subsequent melt flow from the cooler mold bore and thereby maintains an even heat distribution from the heater 10 to the gate tips 42. In this manner, subsequent melt is maintained in a fluid state as it passes through the heated flowpath 50 into the mold block gates 64 and heat loss from the fluid melt to the mold bore is thereby minimized.

As shown, bushing 14 further includes means for sealing the mold bore 60 against melt flow in the form of a skirt or annular flange 52 located on the bushing body 34 between the bushing inlet 16 and the enlarged portion 36. Skirt 52 extends a predetermined distance radially outwardly from the bushing body 34 such that it contacts the mold bore wall 62 and provides a seal 54 between the lower area of the mold bore and the mold bore opening 67. In this regard, the outer diameter of the skirt 52 is slightly greater than the overall outer diameter of the bushing enlarged portion 36. In operation, melt is forced through the spaces between the gate tip members 40 back up the mold bore 60 due to the injection pressure into the annular space 56 until it contacts the skirt seal 52, which prevents further back flow of melt within the mold bore. Melt occupying this annular space 56 solidifies and provides an additional layer of insulation between the bushing 14 and the mold bore 60 to further minimize heat loss from the bushing to the mold block 61. Skirt 52 also maintains the bushing 14 in a central position in the mold bore and positions the gate tip members 40 a predetermined selected distance away from the mold bore wall 62.

A second embodiment of a heater assembly 70 of the present invention is illustrated in FIGS. 5–7 which includes an elongate, generally cylindrical heater member 72 in the form of a torpedo 75 having an inlet end portion 74 and a discharge end portion 76. Torpedo inlet portion 74 includes an annular collar 78 which overlies the top of the torpedo 75 and is shown as radially spaced apart from the torpedo body 79 by ribs 80. A plurality of radially extending ribs 80 define a series of melt injection passages 83 located between the interior of inlet collar 78 and the torpedo body 75 which direct the flow of injected melt along the torpedo body 79 to the outlet torpedo end face 84. Inlet collar 78 preferably is adapted to receive an electrical cable 81 which contains the necessary electrical wiring to supply power to an internal heater element 73 centrally disposed within the torpedo 75 for heating the melt injected into the mold bore 60.

In a construction similar to that of the first embodiment, the heater assembly torpedo body 79 has a generally enlarged portion 82 at its lower end which includes a generally flat torpedo end face 84. Peripherally disposed around the torpedo end face 84 are a series of members 86 which extend a predetermined distance down from the torpedo end face 84 and extend a predetermined distance out from the torpedo body 79. Each member 86 has an outer wall 85, which has a surface configuration generally complementary to the configuration of the mold bore wall 62. Each of the members 86 also includes a curved inner wall 87 which radially extends downwardly and outwardly from the torpedo end face 84 terminating in a lower surface 89 that defines a gate tip or extension 88. The gate tips 88 each include a lower face 90 having a radial channel 92 cut therein extending radially across the gate tip lower face 90. Members 86 are located on the torpedo lower enlarged portion 82 such that the gate tips 88 are closely spaced to the mold bore wall 62 with the gate tip radial channels 92 being in alignment with the mold bore gates 64. In accordance with one aspect of this invention, the downward spacing of the ends of gate tips 88 from the torpedo end face 84 define a recess 95. Initially injected melt accumulates and solidifies in the recess 95 to provide a melt plug 94 which insulates subsequently injected melt from the cooler mold bore walls 62.

In use, the melt is injected into the torpedo inlet 74 and passes through the injection passages 83 along the torpedo body 79 to the nozzle outlet face 84 where it is directed into the mold gates 64 by the gate tips 88. The initial melt will solidify in the lower portion of the mold bore 60, namely, in the recess 95 and the annular space 93 surrounding the torpedo body 79 where it contacts the cooler mold bore wall 62, but will remain fluid near the torpedo body 79 and the nozzle face 84 so as to define a melt flow path 99 for subsequent melt to pass through.

Means for positioning the torpedo within the mold block bore 60 are located on the torpedo body 79 generally midway between the torpedo inlet 74 and the lower enlarged portion 82, preferably near the torpedo lower enlarged portion 82. These positioning means are shown in FIGS. 5-7 as radially extending fins 96. The fins 96 extend a selected distance out from the torpedo body 79 so that they contact the mold bore wall 60 and properly position the gate tips 88 with respect to the mold gates 64.

It will be understood that the embodiments of the present invention which have been described are merely illustrative of a few applications of the principles of the invention. Numerous modifications may be made by those skilled in the art without departing from the true spirit and scope of the invention.

What I claim is:

1. An injection molding heater assembly for heating melt which is injected into a mold bore having a plurality of mold gates leading to a plurality of mold cavities, the heater assembly comprising:

an elongated heated member providing a heated passage for the flow of melt to said plurality of mold gates, the heated member having a body portion extending between an inlet end and a discharge end of the heated member, the body portion being dimensioned to extend within the mold bore and, the discharge end of the heated member having an enlarged portion positioned in melt flow communication with said plurality of mold gates for directing the flow of melt into said plurality of mold gates, said enlarged portion having a plurality of melt flow directing members extending from a nozzle face disposed on said enlarged portion and having gate tips thereon, the gate tips corresponding in number to the plurality of multiple mold gates in said mold bore, said melt flow directing members being peripherally disposed on said enlarged portion of the discharge end of said heated member and extending radially downwardly and outwardly therefrom, each of said gate tips having an outer wall which is dimensioned to be closely spaced to said mold gates when said heater assembly is inserted into said mold bore, each of said gate tips further having an arcuate inner wall extending from said enlarged portion to define a recess between said gate tips and said mold bore for accumulation of injected melt therein, whereby the accumulated melt solidifies and forms an insulating layer between the discharge end of said heated member and said mold bore to minimize heat loss from the injected melt to said mold bore.

2. The multi-gate heater assembly of claim 1, said elongated heated member being a heated torpedo and the heated member inlet includes a annular collar radially spaced apart and surrounding a portion of said torpedo, the annular collar defining at least one heated melt passage extending along the torpedo portion, said torpedo further including means for positioning said torpedo within said mold bore, said positioning means extending radially outwardly from said torpedo between said inlet end and said outlet end, said positioning means further abutting said mold bore.

3. The multi-gate heater assembly of claim 2, wherein said torpedo positioning means includes a plurality of fins peripherally disposed on said torpedo, the outer ends of said fins contacting the internal surface of said mold bore when said torpedo is inserted therein.

4. The multi-gate heater assembly of claim 1, said elongated heated member being a sprue bushing having a central melt passage, said melt passage extending through a body portion of said bushing between an inlet and an outlet of said sprue bushing and said melt passage further opening onto said nozzle face, said bushing having means for positioning said bushing within said mold bore, said positioning means extending radially outwardly from said bushing body portion between said inlet and said outlet.

5. The multi-gate heater assembly of claim 4, wherein said positioning means further includes means for sealing said mold bore to prevent backflow of melt injected into said mold bore, said sealing means including a skirt radially extending from said bushing body portion to contact the interior surface of said mold bore in a sealing relationship.

6. An injection molding heater assembly for heating melt injected into an injection molding mold block mold bore, wherein the mold bore has multiple mold cavities and multiple mold gates leading to the mold cavities, said heater assembly comprising an elongated heated member having a melt inlet end and a melt outlet end and being adapted to centrally extend into said mold bore in heating communication with said mold bore, said elongated heated member being a torpedo, said melt inlet end of said heated member having a longitudinal melt transfer passage extending through said melt inlet end and providing a flow passageway for heated melt through said melt inlet end along said torpedo, said torpedo having an enlarged portion thereon at said melt outlet end, said enlarged portion including a lower gate tip portion having a plurality of gate tips corresponding in number to the mold gates of said mold bore, each of said gate tips extending downwardly from said torpedo enlarged portion and outwardly from said torpedo body to a position adjacent a mold cavity gate, each of said gate tips having an outer wall which is complementary in configuration to said mold bore and an arcuate inner wall, said gate tips being spaced apart and peripherally disposed on said torpedo enlarged portion so as to define a recess beneath said torpedo enlarged portion and between said torpedo enlarged portion said mold bore and said gate tips, each of said gate tips having a lower face which includes a channel extending radially across at least a portion of the lower face, the channel being aligned with said mold gates when said torpedo is inserted into said mold bore, said recess providing an area in said mold bore for injected melt to accumulate in and to solidify in so as to form a melt layer between said gate tips and said mold bore which insulates subsequently injected melt from said mold bore and minimizes heat loss from the injected melt to said mold bore.

7. The injection molding heater assembly of claim 6, wherein said torpedo further includes radially extending fins spaced apart on said torpedo, said fins centrally positioning said torpedo in said mold bore and further positioning said gate tips in alignment with said mold gates.

8. In an injection molding heater assembly for heating injection melt supplied from an injection molding machine to a mold block having multiple mold cavities, the mold block including a mold bore extending therein which provides a passage for flow of the heated melt from said molding machine to the multiple mold cavities, said mold block including a plurality of gates corresponding to the number of said mold cavities which define mold passages for communicating the flow of melt from said mold bore to said mold cavities, the improvement comprising, an elongated heated bushing member having a bushing melt inlet end and a bushing melt outlet end, the bushing member further having a melt transfer passage generally centrally disposed therein and extending axially through said bushing, the bushing melt outlet end terminating in a bushing enlarged end portion having a substantially flat nozzle face disposed thereon and gate direction means including a plurality of gate tips corresponding in number to the number of mold cavity gates in said mold bore, said gate tips being peripherally disposed on said bushing nozzle face, said gate tips extending downwardly and outwardly from a bushing body portion to points adjacent said mold gates, said gate tips having outer surfaces which are generally complementary in configuration to said mold bore and further having arcuate inner surfaces, said gate tips further including a radial channel extending across a gate tip lower surface, said gate tips defining a recess between themselves and said mold bore when said bushing is inserted into said mold bore, said recess being positioned from said mold bore to provide an accumulation area for injected melt to accumulate and solidify in so as to form a melt layer between said gate tips and said mold bore which insulates subsequently injected melt from said mold bore and minimizes heat loss from the injected melt to said mold bore, said bushing member further including means for positioning said bushing within said mold bore, the bushing positioning means including a skirt extending radially outwardly from and disposed on said bushing between said melt inlet end and said melt outlet ends.

9. The injection molding heater assembly of claim 8, wherein said skirt means further includes an annular seal member for sealing the flow of melt in said mold bore.

* * * * *